_US010919215B2_

United States Patent
Johnson et al.

(10) Patent No.: US 10,919,215 B2
(45) Date of Patent: *Feb. 16, 2021

(54) ELECTROSTATIC POLYMER AEROSOL DEPOSITION AND FUSING OF SOLID PARTICLES FOR THREE-DIMENSIONAL PRINTING

(71) Applicant: PALO ALTO RESEARCH CENTER INCORPORATED, Palo Alto, CA (US)

(72) Inventors: David Mathew Johnson, San Francisco, CA (US); Scott A. Elrod, La Honda, CA (US); David K. Biegelsen, Portola Valley, CA (US); Victor Alfred Beck, Livermore, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 691 days.

This patent is subject to a terminal disclaimer.

(21) Appl. No.: 15/683,531

(22) Filed: Aug. 22, 2017

(65) Prior Publication Data

US 2019/0061233 A1  Feb. 28, 2019

(51) Int. Cl.
*B29C 64/141* (2017.01)
*B33Y 10/00* (2015.01)
(Continued)

(52) U.S. Cl.
CPC .............. *B29C 64/141* (2017.08); *B05D 1/04* (2013.01); *B29C 64/205* (2017.08);
(Continued)

(58) Field of Classification Search
None
See application file for complete search history.

(56) References Cited

U.S. PATENT DOCUMENTS 2,291,046 A   7/1942 Lange
2,551,582 A   5/1951 Carlson
(Continued)

FOREIGN PATENT DOCUMENTS

EP   2227834   8/2011
EP   2868390   5/2015
(Continued)

OTHER PUBLICATIONS

Bhat, Pradeep P., "Formation of beads-on-a-string structures during break-up of viscoelastic filaments," Aug. 2010, vol. 6:625-631, Nature Physics, 7 pages.
(Continued)

*Primary Examiner* — Jeffrey M Wollschlager
*Assistant Examiner* — Armand Melendez
(74) *Attorney, Agent, or Firm* — Miller Nash Graham & Dunn LLP

(57) ABSTRACT

An additive manufacturing system has an aerosol generator to aerosolize a powder, a deposition surface, a surface charging element to apply a blanket charge to the deposition surface, a charging print head to selectively remove portions of the blanket charge from the deposition surface, and a transport system to transport the aerosol powder from the aerosol generator to the deposition surface, the transport system having an aerosol charging element to apply charge opposite of the blanket charge to the aerosol powder. An additive manufacturing process includes creating an aerosol from a powder at a spray generator, charging the aerosol to produce a charged aerosol having a first charge, forming a blanket charge on a deposition surface having a second charge of an opposite polarity from the first charge, selectively removing regions of the blanket charge, and transporting the charged aerosol to the charged regions to form structures on the charged regions from the charged aerosol.

7 Claims, 4 Drawing Sheets

(51) Int. Cl.
  *B29C 64/205* (2017.01)
  *B33Y 30/00* (2015.01)
  *B29C 64/209* (2017.01)
  *B05D 1/04* (2006.01)

(52) U.S. Cl.
  CPC ............ *B29C 64/209* (2017.08); *B33Y 10/00* (2014.12); *B33Y 30/00* (2014.12)

(56) References Cited

U.S. PATENT DOCUMENTS

| | | | |
|---|---|---|---|
| 2,862,646 | A | 12/1958 | Hayford et al. |
| 3,052,213 | A | 9/1962 | Schaffert |
| 3,068,115 | A | 12/1962 | Gundlach |
| 3,330,683 | A | 7/1967 | Simm |
| 3,554,815 | A | 1/1971 | Otto |
| 3,626,833 | A | 12/1971 | Koch |
| 3,649,829 | A | 3/1972 | Randolph |
| 3,702,258 | A | 11/1972 | Gibbons et al. |
| 3,717,875 | A | 2/1973 | Arciprete et al. |
| 3,779,166 | A | 12/1973 | Pressman |
| 3,797,926 | A | 3/1974 | Fotland et al. |
| 3,873,025 | A | 3/1975 | Qvarnstrom |
| 3,926,114 | A | 12/1975 | Matuschke |
| 3,977,323 | A | 8/1976 | Pressman et al. |
| 4,034,670 | A | 7/1977 | Zavodny |
| 4,222,059 | A | 9/1980 | Crean et al. |
| 4,384,296 | A | 5/1983 | Torpey |
| 5,103,763 | A * | 4/1992 | Goldowsky ....... G02F 1/133516 118/624 |
| 5,204,697 | A | 4/1993 | Schmidlin |
| 5,270,086 | A | 12/1993 | Hamlin |
| 5,314,119 | A | 5/1994 | Watt |
| 6,066,285 | A * | 5/2000 | Kumar ................ G03G 15/224 264/439 |
| 6,382,524 | B1 | 5/2002 | James |
| 6,576,861 | B2 | 6/2003 | Sampath et al. |
| 6,622,335 | B1 | 9/2003 | Anderson et al. |
| 6,934,142 | B2 | 8/2005 | Grosse et al. |
| 7,083,830 | B2 | 8/2006 | Minko |
| 8,132,744 | B2 | 3/2012 | King et al. |
| 8,272,579 | B2 | 8/2012 | King et al. |
| 8,511,251 | B2 | 8/2013 | Sato |
| 8,552,299 | B2 | 10/2013 | Rogers et al. |
| 8,720,370 | B2 | 5/2014 | Rebstock |
| 8,742,246 | B2 | 6/2014 | Toyoda et al. |
| 9,021,948 | B2 | 5/2015 | Pattekar |
| 10,500,784 | B2 * | 12/2019 | Johnson ................ B29C 64/20 |
| 2002/0053320 | A1 | 5/2002 | Duthaler et al. |
| 2005/0000231 | A1 | 1/2005 | Lee |
| 2006/0035033 | A1 | 2/2006 | Tanahashi et al. |
| 2007/0194157 | A1* | 8/2007 | Golden ................ B05B 5/025 239/698 |
| 2009/0014046 | A1 | 1/2009 | Yu et al. |
| 2009/0155732 | A1 | 6/2009 | Limb et al. |
| 2010/0154856 | A1 | 6/2010 | Yuichi et al. |
| 2011/0017431 | A1 | 1/2011 | Yang et al. |
| 2011/0150036 | A1 | 6/2011 | Lee et al. |
| 2011/0154558 | A1 | 6/2011 | Peter et al. |
| 2012/0227778 | A1 | 9/2012 | Leonov |
| 2013/0087180 | A1 | 4/2013 | Stark et al. |
| 2014/0146116 | A1 | 5/2014 | Paschkewitz |
| 2015/0210009 | A1 | 7/2015 | Johnson et al. |
| 2016/0229119 | A1 | 8/2016 | Renn |
| 2017/0192382 | A1* | 7/2017 | Baecker ................ G03G 15/24 |
| 2018/0015730 | A1* | 1/2018 | Essien ................ B41J 29/02 |

FOREIGN PATENT DOCUMENTS

| | | |
|---|---|---|
| EP | 3196003 A1 | 7/2017 |
| FR | 1035235 | 4/1951 |
| WO | 9313897 | 7/1993 |
| WO | 9709125 | 3/1997 |
| WO | 2004028707 | 4/2004 |
| WO | 2006122645 | 11/2006 |
| WO | 2015183644 | 12/2015 |
| WO | 2016205743 A1 | 12/2016 |

OTHER PUBLICATIONS

Le, Hue P., "Progress and Trends in Ink-jet Printing Technology," Jan./Feb. 1998, vol. 42:49-62, Journal of Imaging Science and Technology, 16 pages, found at: http://www.imaging.org/ist/resources/tutorials/inkjet.cfm.

Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.

Owen, M., "Misting of non-Newtonian Liquids in Forward Roll Coating," Jul. 13, 2011, Journal of Non-Newtonian Fluid Mechanics, vol. 166:1123-1128, 6 pages.

Shi, X.D., "A Cascade of Structure in a Drop Falling from a Faucet," Jul. 8, 2004, vol. 265:219-222, Science, 4 pages.

Chapter 15, "Ink Jet Printing", 14 pages, found at http://www.lintech.org/comp-per/15INK.pdf.

Marple, A. and Liu, Y.H.: "Characteristics of Laminar Jet Impactors", Environmental Science & Technology, vol. 8, No. 7, Jul. 1974, pp. 648-654.

Bailey, Adrian G.: "The Science and technology of electrostatic powder spraying, transport and coating", Journal of Electrostatics, vol. 45, 1998, pp. 85-120.

Domnick, et al.: "The Simulation of Electrostatic Spray Painting Process with High-Speed Rotary Bell Atomizers. Part II: External Charging", Part. Part. Syst. Charact. vol. 23, 2006, pp. 408-416, URL: http://www.ppsc-journal.com.

Kelly, Ryan T, et al.: "The ion funnel: theory, implementations, and applications", Mass Spectrometry Reviews,vol. 29, 2010, pp. 294-312.

Crowe, Clayton et al.: "Multiphase Flows With Droplets and Particles", CRC Press, LLC, 1998.

TSI Product Information for Small Scale Power Disperser 3433, https://www.tsi.com/products/aerosol-generators-dispersers/powder-generators/small-scale-powder-disperser-3433/ printed May 10, 2019.

Bingheng et al., "Development Trends in Additive Manufacturing and 3D Printing," Engineering 2015, 2015(1)(1); 85-89.

N. N.: "Filament Extension Atomizer, Next Generation Spray Technology for Difficult Spray Materials," Sep. 8, 2016, found at https://www.parc.com/content/attachments/FEA-Spray_fact_sheet_20160808.pdf.

Mcclure, Max, "Stanford Researchers' Cooling Glove Better than Steroids—and Helps Solve Physiological Mystery Too", Stanford Report, Aug. 29, 2012, 3 pages, retrieved from the Internet: http://news.stanford.edu/news/2012/august/cooling-glove-research-082912.html, retrieved on Dec. 19, 2014.

Matheson, Rob, "Cool Invention Wins First Place at MADMEC", MIT News Office, Oct. 17, 2013, 3 pages, retrieved from the Internet: http://newsoffice.mit.edu/2013/madmec-design-competition-1017, retrieved on Dec. 19, 2014.

Vanhemert, Kyle, "MIT Wristband Could Make AC Obsolete", Wired.com, Oct. 30, 2013, retrieved from the Internet: http://www.wired.com/2013/10/an-ingenious-wristband-that-keeps-your-body-at-theperfect-temperature-no-ac-required/, retrieved on Dec. 19, 2014.

Francioso, L., "Flexible thermoelectric generator for ambient assisted living wearable biometric sensors", Journal of Power Sources, vol. 196, Issue 6, Mar. 15, 2011, pp. 3239-3243.

http://www.stacoolvest.com/, retrieved on Dec. 19, 2014.
http://www.steelevest.com/, retrieved on Dec. 19, 2014.
http://veskimo.com/, retrieved on Dec. 19, 2014.
http://glaciertek.com/, retrieved on Dec. 19, 2014.

Chen, A., "Dispenser-printed planar thick-film thermoelectric energy generators," J. Micromech. Microeng., 21(10), 2011.

Hewitt, A.B., "Multilayered Carbon Nanotube/Polymer Composite Based Thermoelectric Fabrics," Nano Letters, 12 (3), pp. 1307-1310, 2012.

(56) References Cited

OTHER PUBLICATIONS

Arens, E., "Partial- and whole-body thermal sensation and comfort—Part I: Uniform environmental conditions," Journal of Thermal Biology, vol. 31, Issues 1-2, Jan. 2006, pp. 53-59.

Arens, E., "Partial- and whole-body thermal sensation and comfort—Part II: Non-uniform environmental conditions," Journal of Thermal Biology, vol. 31, Issues 1-2, Jan. 2006, pp. 60-66.

Bullis, Kevin, "Expandable Silicon", MIT Technology Review, Dec. 14, 2007, URL: http://www.technologyreview.com/news/409198/expandable-silicon/, retrieved from the Internet on Dec. 23, 2014.

"Ortho-Planar Spring", BYI Mechanical Engineering Website, URL: http://compliantmechanisms.byu.edu/content/ortho-planar-spring, retrieved from the Internet on Dec. 23, 2014.

S.-J. Kim, J.-H. Wea and B.-J. Cho: "A wearable thermoelectric generator fabricated on a glass fabric," Energy Environmental Science, 2014.

L. Francioso, C. De Pascali, A. Taurino, P. Siciliano, A. De Risi: "Wearable and flexible thermoelectric generator with enhanced package," In Proc. SPIE 8763, Smart Sensors, Actuators, and MEMS VI, 876306, May 2013.

C. Huizenga, H. Zhang, E. Arens, D. Wang: "Skin and core temperature response to partial-and whole-body heating and cooling," Journal of Thermal Biology, vol. 29, Issues 7-8, Oct.-Dec. 2004, pp. 549-558.

Sholin, V. et al: "High Work Function Materials for Source/Drain Contacts in Printed Polymer Thin Transistors," Applied Physics Letters, vol. 92, 2008.

Zhuo, Li, et al.: "Highly Conductive, Flexible, Polyurethane-Based Adhesives for Flexible and Printed Electronics," Advanced Functional Materials, vol. 23, p. 1459-1465, wileyonlinelibrary.com.

\* cited by examiner

```
┌─────────────────────────┐
│ BLANKET DEPOSITION SURFACE │─ 400
│      WITH CHARGE        │
└───────────┬─────────────┘
            ▼
┌─────────────────────────┐
│ SELECTIVELY NEUTRALIZE CHARGE │─ 402
│   FROM DEPOSITION SURFACE    │
└───────────┬─────────────┘
            ▼
┌─────────────────────────┐
│  GENERATE AEROSOL FROM  │─ 404
│         POWDER          │
└───────────┬─────────────┘
            ▼
┌─────────────────────────┐
│   TRANSPORT AEROSOL TO  │─ 406
│   DEPOSITION SURFACE    │
└───────────┬─────────────┘
            ▼
┌─────────────────────────┐
│ CHARGE AEROSOL IN TRANSPORT │─ 408
└───────────┬─────────────┘
            ▼
┌─────────────────────────┐
│  FUSE AEROSOL ON SURFACE │─ 410
└─────────────────────────┘
```

FIG. 5

ELECTROSTATIC POLYMER AEROSOL DEPOSITION AND FUSING OF SOLID PARTICLES FOR THREE-DIMENSIONAL PRINTING

TECHNICAL FIELD

This disclosure relates to polymer spray deposition, more particularly to polymer spray deposition using powders.

BACKGROUND

Custom manufacturing of parts is a growing industry and has wide ranging applications. Traditionally, injection molding machines and other machining techniques were used to create models of objects or to create the objects themselves. More specifically, heated materials like glass, metals, thermoplastics, and other polymers are injected into an injection mold specifically formed in the shape of the desired object. The material can cool in the mold and take on the shape of the mold to form the object. Injection molds are expensive and time-consuming to create and changes to the shape of the object are difficult to accommodate without further increasing the time and expense of creating the object.

The additive manufacturing industry arose in response to the expense, time, and difficulty in changing injection molds to create models or objects themselves. Known additive manufacturing techniques include fused deposition modeling (FDM), stereolithography (SLA), selective laser sintering (SLS), and jetting systems among others. Each known additive manufacturing technique has limitations in materials, expense, and/or volume capabilities that prevent the production of small run, customized manufacturing and prototyping using a complete set of thermoplastic materials. Further, known additive manufacturing techniques are unable to accurately create a part with mechanical properties, surface finish, and feature replication of the quality object produced by traditional techniques like injection molding.

In situations in which additive manufacturing does not produce parts of sufficient performance for an application, an entire industry of rapid computer numerical control (CNC) machining and rapid injection molding using low cost tools has arisen. However, these techniques are significantly more expensive than additive manufacturing techniques and have their own process limitations.

The industry was forced to decide between a high quality, high volume capability object produced by the traditional, but expensive, inflexible, and time-consuming techniques like injection molding and additive manufacturing techniques that produced a lower quality object, perhaps without the desired structural integrity, and sometimes without the desired materials, but with greater speed and flexibility.

For example, FDM and SLS are limited in the type of material able to be used and create a less than 100% density object. Rapid CNC molding has better quality objects with great feature detail and finishes, but remains expensive. Prototypes created with the known additive manufacturing techniques are often refined until a final design is selected at which point an injection mold is created for large scale, high quality injection molding production. Such a multi-phase production process is also time-consuming and expensive.

One method involves polymer spray deposition (PSD). This process forms a spray or aerosol of polymer drops and charges them to cause them to selectively deposit on a charged surface. The formation of the aerosol may take many forms. Many of them typically require controlled temperature and an inert atmosphere. These typically result in higher costs and more complex manufacturing environments.

SUMMARY

An embodiment is an additive manufacturing system that has an aerosol generator to aerosolize a powder, a deposition surface, a surface charging element to apply a blanket charge to the deposition surface, a charging print head to selectively remove portions of the blanket charge from the deposition surface, and a transport system to transport the aerosol powder from the aerosol generator to the deposition surface, the transport system having an aerosol charging element to apply charge opposite of the blanket charge to the aerosol powder.

Another embodiment is an additive manufacturing process that includes creating an aerosol from a powder at a spray generator, charging the aerosol to produce a charged aerosol having a first charge, forming a blanket charge on a deposition surface having a second charge of an opposite polarity from the first charge, selectively removing regions of the blanket charge, and transporting the charged aerosol to the charged regions to form structures on the charged regions from the charged aerosol.

BRIEF DESCRIPTION OF THE DRAWINGS

FIG. 5 shows an embodiment of a method of three-dimensional additive manufacturing.

DETAILED DESCRIPTION OF THE EMBODIMENTS

The embodiments here provide the benefits of three-dimensional, digital, additive manufacturing techniques with a broader range of thermoplastic materials than would otherwise be attainable. They result in feature size resolution of the produced objects similar in complexity and structural integrity to more traditional manufacturing techniques, such as injection molding processes. The systems and methods here can aerosolize and create three-dimensional objects out of high molecular weight polymers powders and other thermoplastics, such as nylon, polystyrene, polycarbonate, polypropylene, polysulfone, and acetal. The use of powders may alleviate some of the manufacturing restraints on temperature and atmospheres that affect fluids.

Figure 1:
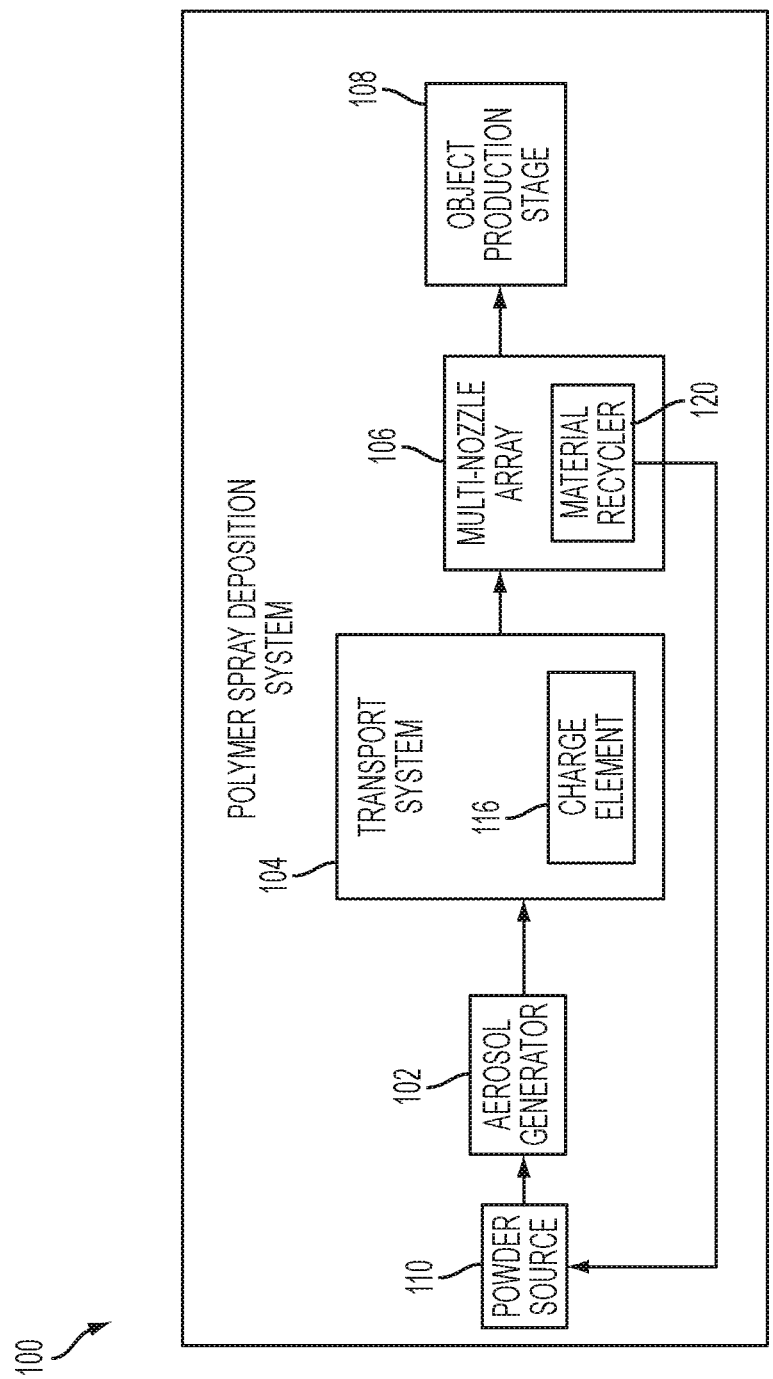
FIG. 1 shows an embodiment of a three-dimensional additive manufacturing system.

FIG. 1 shows a block diagram of an example polymer deposition system 100 that includes an aerosol generator 102, a transport system 104, a multi-nozzle array 106, and an object production stage 108. The aerosol generator 102 receives powder from a powder source 110 and. The aerosol of the powder can be formed in many different methods well known in the art, such as those disclosed in U.S. Pat. No. 2,862,646, or found at www.tsi.com/small-scale-powder-disperser-3443. In one embodiment, a stream of high velocity gas is blown into a container partially filled with power. The airflow entrains the particles and the chaotic nature of the flow mixes the air and powder such that it creates an aerosol. This aerosol can be removed from the container with another flow or a vacuum.

A transport system 104 then transports the aerosolized powder from the aerosol generator 102 to a multi-nozzle array 106 that dispenses the powder onto a surface in the object production stage. The transport system 104 includes a charge element 116 that charges the spray with a charge of a first polarity. As will be discussed in more detail later, the deposition surface will have regions with an opposite charge to attract the aerosolized powder particles to those regions. The charged aerosol is then applied to the surface using the multi-nozzle array to the deposition surface. Any 'waste' or leftover material may be recycled by the material recycler 120.

Figure 2:
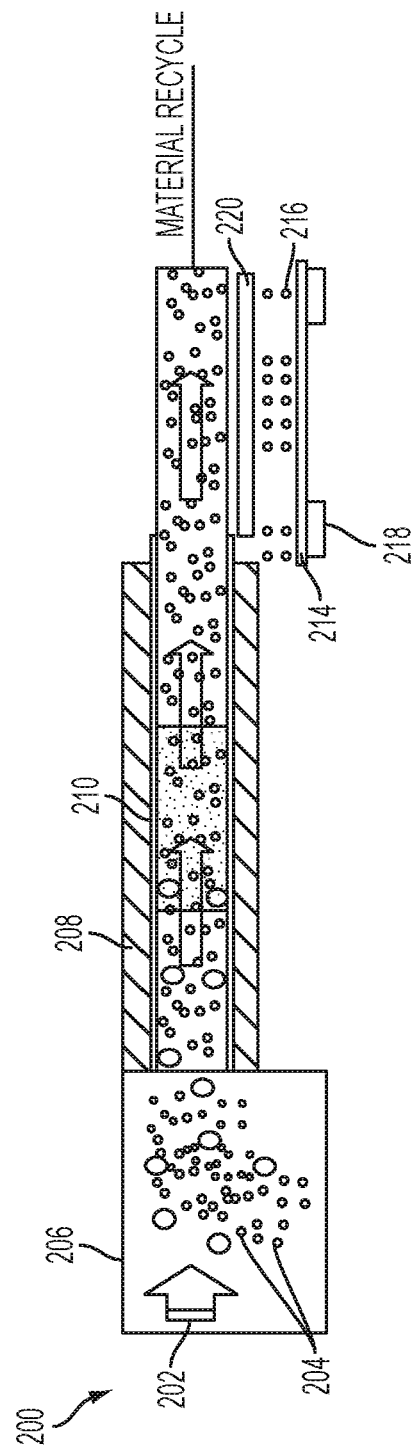
FIG. 2 shows another view of a three-dimensional additive manufacturing system.

FIG. 2 shows an alternative view of an additive manufacturing system 200. The aerosol generator 206 aerosolizes a powder shown as particles 204. The transport system 208, possibly consisting of an air stream 202, transports the aerosolized powder from the aerosol generator 206 to the deposition surface 214. In one embodiment, the transport system may include tubing, with insulation as needed, a sheath flow of air, and possible filtration. In addition, the transport stream may include an inertial impactor to allow size selection, as well as filters as needed.

Charge element 210 applies a charge of a first polarity to the aerosol. This may involve a set of electrodes on either side of the transport system to generate an electric field through which the aerosol passes. The deposition surface 214 will receive the charged particles such as 216. In one embodiment, the deposition surface resides on a stage 218 that may be a three-axis (x, y, and z) stage that moves relative to the deposition nozzle array.

Prior to the charged particles reaching the deposition surface selective regions of the deposition surface received an opposite charge. In one embodiment, a first charging device such as a corotron 220 (a corona charging device) applies a blanket charge to the deposition surface, the charge being of a opposite polarity to the first polarity. While FIG. 2 shows the charging device 220, it will only be present prior to the arrival of the powder spray.

After the blanket charge formed on the deposition surface, another charging device, such as an ionographic print head, neutralizes the charge from the non-part portions of the surface. The particles will be attracted to the portions of the deposition surface that still have the opposite charge.

Once the particles from the powder spray reach the deposition surface and 'stick' to the oppositely charged regions, the parts or other structures will begin to form. During or after formation of the parts, the powder material may undergo heating to fuse the material into the parts. Fusing can be achieved through the application of heat and/or pressure. Heat can be applied through the use of an infrared source, a heated roller, or the use of high temperature air. Other embodiments may involve application of ultraviolet light to cure powder formations made from UV-curable powders. In addition, the powder aerosol may also be pressurized to assist with the fusing.

Figure 3:
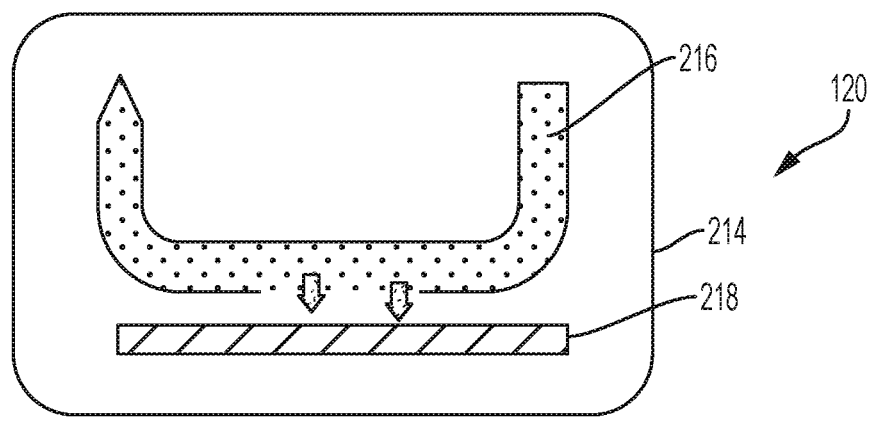
FIG. 3 shows an embodiment of a return and recycling path.

As the powder material collects in the selected regions of the deposition surface, portions of the powder spray will fall off the deposition surface. In some embodiments, the powder material that does not stick could be recycled back to the aerosol generator 206. The material recycling will typically occur away from the heat or other energy used to fuse the parts forming at the charged regions of the deposition surface. FIG. 3 shows an example of the recycling path 120 from FIG. 1. The powder material flows past the deposition surface 214 and some of the particles 216 are attracted to the regions of the deposition surface 214.

Figure 4:
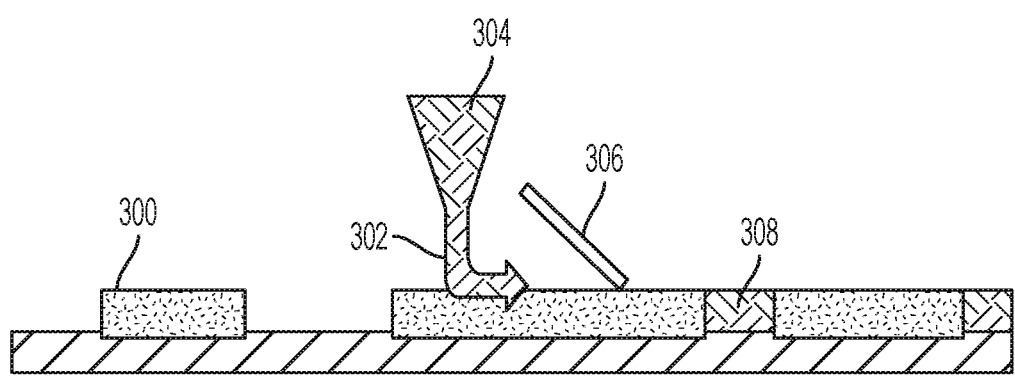
FIG. 4 shows an embodiment of a three-dimensional additive manufacturing system with a support material.

As shown in FIG. 4, once the powder material is fused to form the parts such as 300, an optional support material 302 may fill in the gaps such as 308 to create a smooth flat surface. The material could reach the gaps from a nozzle 304 and a doctor blade 306 or other implement would smooth it in to the gaps to provide more structurally robust parts.

FIG. 5 shows an embodiment of an overall process flow. At 400, a deposition surface receives a blanket charge at 400. Another device, such as an ionographic print head, selectively neutralizes charge from the deposition surface at 402. Meanwhile, the system generates an aerosol from a powder at 404 and transports it to the deposition surface 406. While the aerosol is in transport, it undergoes charging at 408. As the aerosol reaches the deposition surface it is fused onto the surface to form the desired structures at 410. In an optional step, a support material fills the gaps, discussed previously.

In this manner, three-dimensional additive manufacturing can create parts in a manufacturing process using powders. This may provide a less complex and less expensive manufacturing process for formation of a polymer for spray deposition.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An additive manufacturing system, comprising; a powder source; an aerosol generator to use a flow of gas to aerosolize powder from the source to produce an aerosol powder; a deposition surface; a surface charging element to apply a blanket charge to the deposition surface; a charging print head to selectively remove portions of the blanket charge from the deposition surface; and a transport system comprising one of either a second flow of gas or a vacuum, to transport the aerosol powder from the aerosol generator to the deposition surface, the transport system having an aerosol charging element to apply charge opposite of the blanket charge to the aerosol powder within the transport system such that the aerosol forms the part being manufactured on portions of the deposition surface where charge remains; a nozzle to receive the aerosol powder from the transport system to dispense the aerosol powder onto the deposition surface; and a movable object production stage to hold the deposition surface, the movable object production stage being translatable relative to the nozzle.

2. The system of claim 1, further comprising an inertial impactor in the transport system to select sizes of particles.

3. The system of claim 1, further comprising a filter in the transport system.

4. The system of claim 1, further comprising a dispenser to dispense a supporting material between the structures.

5. The system of claim 1, wherein the surface charging element comprises a corotron.

6. The system of claim 1, wherein the charging print head comprises a ionographic print head.

7. The system of claim 1, wherein the transport system comprises tubing to contain the aerosol powder as the aerosol powder moves between the aerosol generator and the deposition surface.

* * * * *